(12) United States Patent
Buhrke

(10) Patent No.: US 8,166,837 B2
(45) Date of Patent: May 1, 2012

(54) TRANSMISSION ARRANGEMENT OF AN AGRICULTURAL OR INDUSTRIAL UTILITY VEHICLE

(75) Inventor: Frank Buhrke, Birkenau (DE)

(73) Assignee: Deere & Company, Moline, IL (US)

( * ) Notice: Subject to any disclaimer, the term of this patent is extended or adjusted under 35 U.S.C. 154(b) by 679 days.

(21) Appl. No.: 12/337,032

(22) Filed: Dec. 17, 2008

(65) Prior Publication Data

US 2009/0158867 A1    Jun. 25, 2009

(30) Foreign Application Priority Data

Dec. 22, 2007 (DE) .......................... 10 2007 062 457

(51) Int. Cl.
  *B60K 17/00* (2006.01)
(52) U.S. Cl. .................................................. 74/15.82
(58) Field of Classification Search ................ 74/15.82, 74/11, 15.2, 15.4, 15.6, 15.66, 15.69, 15.8, 74/15.84, 15.86, 15.88, 665 G, 665 K; 180/53.8, 180/305, 374, 376, 367, 375
See application file for complete search history.

(56) References Cited

U.S. PATENT DOCUMENTS

| | | | |
|---|---|---|---|
| 4,208,923 A | 6/1980 | Ikegami | |
| 4,546,661 A * | 10/1985 | Weis et al. | ...................... 74/15.4 |
| 6,109,384 A * | 8/2000 | Bromley et al. | .............. 180/242 |
| 6,314,827 B1 * | 11/2001 | Matsufuji | ....................... 74/325 |
| 6,546,830 B2 * | 4/2003 | Kanazawa | ................... 74/665 G |
| 7,617,892 B2 * | 11/2009 | Nishimoto et al. | .......... 180/53.4 |

FOREIGN PATENT DOCUMENTS

| | | |
|---|---|---|
| DE | 1957894 | 11/1969 |
| DE | 2051556 | 10/1970 |
| DE | 3901229 | 1/1989 |
| DE | 39 12 855 | 10/1990 |
| DE | 10 2005 025 567 | 12/2006 |
| GB | 1 600 526 | 10/1981 |

OTHER PUBLICATIONS

European Search Report, Apr. 6, 2009, 5 Pages.
German Search Report, Aug. 13, 2008, 4 Pages.

* cited by examiner

*Primary Examiner* — Robert Pezzuto

(57) ABSTRACT

The present invention relates to a transmission arrangement of an agricultural or industrial utility vehicle, in particular of an agricultural tractor. The transmission arrangement comprises a drive transmission, which can be driven by an engine of the utility vehicle, and a PTO transmission. The drive transmission has a rear-axle transmission output for driving a rear axle of the utility vehicle. The drive transmission has a front axle transmission output for driving a front axle of the utility vehicle. The PTO transmission serves to drive an implement adaptable to the utility vehicle. The PTO transmission can be driven via a PTO transmission output of the drive transmission or independently of the drive transmission via a shaft driven by the engine of the utility vehicle. The transmission arrangement according to the invention is characterized in that the PTO transmission can be coupled to the front axle transmission output of the drive transmission, in order to couple the output speed of the PTO transmission to the speed of travel of the utility vehicle.

17 Claims, 5 Drawing Sheets

TRANSMISSION ARRANGEMENT OF AN AGRICULTURAL OR INDUSTRIAL UTILITY VEHICLE

FIELD OF THE INVENTION

The present invention relates to a transmission arrangement of an agricultural or industrial utility vehicle, in particular of an agricultural tractor. The transmission arrangement comprises a drive transmission, which can be driven by an engine of the utility vehicle, and a power take-off (PTO) transmission. The drive transmission has a rear-axle transmission output for driving a rear axle of the utility vehicle. The drive transmission has a front axle transmission output for driving a front axle of the utility vehicle. The PTO transmission serves to drive an implement adaptable to the utility vehicle. The PTO transmission may be driven via a PTO transmission output of the drive transmission or independently of the drive transmission via a shaft driven by the engine of the utility vehicle.

BACKGROUND OF THE INVENTION

In the state of the art, agricultural tractors are equipped with an internal combustion engine, which in operation drives the wheels for propelling the tractor, and a PTO shaft. The PTO shaft serves to drive auxiliary attachments, such as soil cultivating implements or baling presses. A PTO transmission is provided between the engine and the PTO output of the tractor. Such PTO transmissions generally have multiple transmission stages selectable by an operator, which for specific engine speeds lead to desired rotational speeds of the PTO shaft. The PTO transmission can also be brought into a neutral position, in which the PTO shaft can rotate freely.

In known transmissions the arrangements used are basically ones in which the PTO transmission is driven directly by a shaft, which rotates at the speed of the internal combustion engine and independently of the vehicle transmission. In other words, the rotational speed or the speed transmission ratio of this shaft for the PTO transmission is not influenced by the drive transmission. Provision might be made, however, for the shaft driven by the engine of the utility vehicle to be led to the PTO transmission through the housing of the drive transmission, without being influenced thereby. Consequently the PTO transmission and hence the PTO shaft or the PTO stub shaft will be driven at a speed which varies directly as a function of the speed of the engine of the utility vehicle. Adjustable speed-increasing and speed-reducing steps may also be provided here. Usual speeds of PTO shafts are either 540 or 1000 rpm.

A PTO transmission of this type may be driven by rotationally connecting the shaft, driven by the engine of the utility vehicle and serving to drive the PTO transmission, to a transmission input shaft of the drive transmission. The input shaft of the drive transmission can be isolated from the engine output shaft by means of a clutch, the shaft driven by the engine of the utility vehicle then also being isolated from the engine output shaft. In such an arrangement the PTO shaft can be operated only when the drive transmission is also being driven.

In another arrangement an additional clutch is provided, which serves to bring the shaft driven by the engine of the utility vehicle into rotational connection with the PTO transmission. With such an arrangement both the drive transmission and the PTO transmission may be driven simultaneously. It is also possible, however, to drive either the drive transmission or the PTO transmission separately.

If the PTO transmission or the PTO stub shaft of the PTO transmission is to rotate at a speed which varies as a function of the speed of travel of the utility vehicle (also referred to as a so-called road vehicle PTO), it is possible to couple the PTO transmission to a shaft serving to drive the rear axle of the utility vehicle.

It is not possible, especially in a transmission arrangement in which either the drive transmission or the PTO transmission can be driven separately, to couple a hydraulic pump and/or a transmission oil pump to an input shaft of the drive transmission, which is arranged on the engine output side, on the other side of the clutch for the drive transmission, since there is an operating state in which the drive transmission is inoperative. If the PTO transmission is in operation whilst this operating state prevails, it too should be supplied with transmission oil. Accordingly, such pumps are located directly on the engine of the utility vehicle and are driven directly by an engine output shaft.

Thus the possibility is known, of leading the shaft, which is driven by the engine of the utility vehicle and which serves to drive the PTO transmission, through the drive transmission and using a transmission shifting point to establish a rotational connection between the PTO transmission and the shaft driven by the engine of the utility vehicle on the one hand and the rear axle transmission output of the drive transmission on the other. This transmission shifting point also has a neutral position, in which the PTO transmission is isolated from the engine and from the drive transmission. This transmission shifting point is located in the drive transmission.

If the hydraulic pump and/or the transmission oil pump can or should no longer be arranged directly on the engine housing, it is feasible for the shaft, which is driven by the engine of the utility vehicle and which also serves to drive the PTO transmission, to be led through the drive transmission and to turn in constant rotational connection with the output shaft of the engine of the utility vehicle. The requisite rotational speed for the hydraulic pump and/or the transmission oil pump can then be harnessed from the constantly rotating shaft between the drive transmission and the PTO transmission. In order that the PTO transmission can now be switched on or off, a clutch which serves to establish a rotational connection to the shaft driven by the engine of the utility vehicle is provided on the input to the PTO transmission. In such a transmission arrangement it is not readily possible to achieve a road vehicle PTO, i.e. to couple the output speed of the PTO transmission to the speed of travel of the utility vehicle, since the hydraulic pump and/or the transmission oil pump is then operated at a speed varying as function of the speed of travel.

SUMMARY OF THE INVENTION

The object of the present invention therefore is to provide a transmission of the type described in the introduction, which will serve to overcome the aforementioned problems. In particular, it is intended to provide a transmission arrangement in which the PTO transmission can on the one hand be coupled to an engine speed which delivers an output speed usual for a PTO transmission, that is to say 1000 or 540 rpm, for example. On the other hand, the PTO transmission of such a transmission arrangement should also be capable of operation at a speed which varies as a function of the speed of travel of the utility vehicle. A transmission oil pump and/or a hydraulic pump should be capable of operation at all times, irrespective of whether only the PTO transmission, the PTO transmission and the vehicle transmission, or only the vehicle transmission is in operation.

According to the invention a transmission of the type specified in the introduction is provided wherein the PTO transmission can be coupled to the front axle transmission output of the drive transmission, in order to couple the output speed of the PTO transmission to the speed of travel of the utility vehicle.

According to the invention it is recognized that such a transmission arrangement allows the drive clutch, which serves to isolate the vehicle transmission from the engine and to connect it thereto, to be arranged between the engine and the drive transmission or to be integrated into the drive transmission. It is further possible to provide a PTO clutch which is independent of the former clutch and which serves to establish a rotational connection to the shaft driven by the engine of the utility vehicle (independently of the drive transmission) or to a PTO transmission output of the vehicle transmission. The fact that a further coupling is provided, namely between the PTO transmission and the front axle transmission output of the drive transmission, means that the PTO transmission can be operated via this coupling in order to activate the road vehicle PTO. To this extent the shaft driven by the engine of the utility vehicle can be in constant rotational connection with the engine output shaft, independently of the vehicle transmission, in order to drive a hydraulic pump and/or a transmission oil pump. This is still the case even where the PTO transmission is intended to work in the road vehicle PTO operating mode. For in this operating state the PTO transmission is coupled to the front axle transmission output of the drive transmission by means of a correspondingly provided shaft, for example, and therefore delivers a torque flow by means other than those in conventional transmission arrangements, that is to say not via a shaft driven by the engine of the utility vehicle or via a PTO transmission output of the drive transmission.

Specifically, the PTO transmission has a PTO transmission input. The PTO transmission input can be coupled to the PTO transmission output of the drive transmission or to the shaft driven by the engine of the utility vehicle. The PTO transmission input could therefore have an input shaft of the PTO transmission which can be coupled to an output shaft of the PTO transmission output of the drive transmission. This coupling could be interrupted or established, for example, by a clutch.

The PTO transmission could also have a further PTO transmission input, which can be coupled to the front axle transmission output of the drive transmission. In the case of the further PTO transmission input, an additional input shaft of the PTO transmission could likewise be provided, which can be coupled to the output shaft of the PTO transmission. The additional input shaft of the PTO transmission could be coupled to a corresponding shaft of the front axle transmission output of the drive transmission.

According to a preferred embodiment the PTO transmission can be driven independently of the drive transmission, either via the front axle transmission output of the drive transmission or via a shaft driven by the engine of the utility vehicle. In this embodiment the transmission arrangement is therefore formed in such a way that both operating modes are possible. In the one operating mode the PTO transmission is driven via the front axle transmission output of the drive transmission. In the other operating mode the PTO transmission is driven independently of the drive transmission via a shaft driven by the engine of the utility vehicle. For this purpose corresponding clutches or transmission shifting points could be provided, which also serve to adjust the two operating modes independently of one another. A utility vehicle with such a transmission arrangement therefore provides a road vehicle PTO on the one hand and a PTO with a conventional rotational speed on the other.

Specifically, the PTO transmission could be driven either via the front axle transmission output of the drive transmission or via the PTO transmission output of the drive transmission. In this embodiment the PTO transmission can be driven via the PTO transmission output of the drive transmission, if the PTO shaft is to deliver the usual speed of 540 or 1000 rpm. Accordingly the PTO transmission output of the drive transmission is configured in such a way that a rotational speed is available there, which does not vary as a function of the instantaneous speed of travel of the utility vehicle.

If the PTO transmission input can be coupled to the shaft driven by the engine of the utility vehicle, a clutch could be provided, which is capable of interrupting or establishing this connection. Such a clutch is preferably embodied in the form of a friction clutch, in particular a wet-running clutch, and thereby allows the PTO transmission to be activated in mobile operation, there being no need, therefore, for speed synchronization between the shaft driven by the engine of the utility vehicle and the shaft of the PTO transmission input.

If the PTO transmission output of the drive transmission can be coupled to the PTO transmission input, this coupling could likewise be established or interrupted by a clutch. This clutch could also have a friction clutch.

In a preferred embodiment the front axle transmission output of the drive transmission can be coupled to the further PTO transmission input by a clutch. This clutch accordingly allows an operation of the PTO transmission in which the output speed of the PTO transmission varies as a function of the speed of travel of the utility vehicle.

The aforementioned clutches could be assigned to the PTO transmission input and/or to the further PTO transmission input, it being feasible, in principle, for the clutch also to be arranged on the front axle transmission output of the drive transmission in order to establish a torque connection between the front axle transmission output and the further PTO transmission input.

As already indicated, the clutch is a friction clutch or a positively interlocking clutch. In principle, therefore, the clutches described above for establishing a torque connection for the road vehicle PTO operation on the one and for a PTO shaft speed range of 1000 and/or 540 rpm on the other, might in each case be embodied as a positively interlocking clutch. In activating the PTO, however, it is necessary for this purpose to establish torque synchronization between the shafts to be coupled, so that the drive clutch for driving the drive transmission has to be disengaged, for example, in order that a torque connection can be established between the PTO transmission output of the drive transmission and the PTO transmission. As already described, however, a friction clutch is in each case preferred, since in this case the PTO can be activated even in the absence of speed synchronization.

In an especially preferred embodiment a transmission shifting point is provided, which serves for switching between a PTO transmission driven by the front axle transmission output of the drive transmission or driven by the shaft driven by the engine of the utility vehicle. Such a transmission shifting point could be provided in the PTO transmission. For example, the PTO transmission might have an input shaft of the PTO transmission input on one side and a further input shaft of the further PTO transmission input. These two input shafts of the PTO transmission could each be brought into rotational connection with an output shaft of the PTO transmission via the transmission switching point, one gear pair bringing the input shaft of the PTO transmission input into rotational connection with output shaft of the PTO transmission and another gear pair bringing the further input shaft of the further PTO transmission input into rotational connection with the output shaft. In this respect, even without the provision of an additional clutch, the input shaft of the PTO transmission input and the further input shaft of the further PTO transmission input could be in constant rotational connection with the shaft driven by the engine of the utility vehicle on the one hand and the front axle transmission output of the drive transmission on the other, although the transmission shifting point should have a neutral position, in order that the PTO shaft can also be shut off. According to the shift position of the transmission shifting point of the PTO transmission, a torque flow is then established between the shaft driven by the engine of the utility vehicle and the output shaft of the PTO transmission or between the front axle transmission output of the drive transmission and the output shaft of the PTO transmission. Independently of this, a further transmission shifting point may be provided, which serves for switching between the commonly used rotational speeds of 1000 or 540 rpm, this further transmission shifting point acting solely on the PTO transmission input that is coupled to the shaft driven by the engine of the utility vehicle.

Similarly, in an alternative embodiment, a transmission shifting point could be provided, which serves for shifting between a PTO transmission driven by the front axle transmission output of the drive transmission or driven by the PTO transmission output of the drive transmission. The explanation given with regard to the transmission shifting point for switching between the front axle transmission output of the drive transmission and the shaft driven by the engine of the utility vehicle also applies analogously to this embodiment. In particular, it is expedient in both embodiments to assign the transmission shifting point to the PTO transmission.

Specifically, the PTO transmission could be coupled to the front-axle transmission output by a shaft. If the PTO transmission input is coupled to the shaft driven by the engine, the shaft between the front axle transmission output and the PTO transmission provides an additional second shaft, via which torque can flow to the PTO transmission.

The shaft could now be coupled to a part of the front axle transmission output which is active or turning even when the front axle drive is inoperative. Specifically, this part of the front axle transmission output is a gear wheel or a shaft, which always turns even though the drive transmission is active and functioning according to the gearing ratio currently set or the speed of travel. In this respect any shaft provided between the front axle transmission output and the PTO transmission will always be in rotational motion, so that a torque flow via this transmission branch can be activated by a clutch or transmission switching point, so that the output speed of the PTO transmission is coupled to the speed of travel of the utility vehicle.

Alternatively, the shaft could be coupled to a part of the front axle transmission output, which is active or turning only when a front axle drive is operative. In this embodiment the PTO transmission can be operated as a function of the speed of travel of the utility vehicle only when the front axle drive is activated, since only in this state does the front axle transmission output, serving to drive the PTO transmission, also rotate, thereby transmitting torque to the PTO transmission.

The transmission arrangement according to the invention comprises a drive transmission which can be driven by an engine of the utility vehicle, and a PTO transmission. The drive transmission has a drive transmission output for driving a vehicle axle of the utility vehicle. The PTO transmission serves to drive an implement adaptable to the utility vehicle. The PTO transmission may be driven by a shaft via a PTO transmission output of the drive transmission or independently of the drive transmission via a shaft driven by the engine of the utility vehicle. The PTO transmission can be coupled to the drive transmission output of the drive transmission via a further shaft, in order to couple the output speed of the PTO transmission to the speed of travel of the utility vehicle.

BRIEF DESCRIPTION OF THE DRAWINGS

In explaining the preferred exemplary embodiments of the invention reference is made to the accompanying drawings, wherein.

DESCRIPTION OF THE PREFERRED EMBODIMENT

Figure 1:
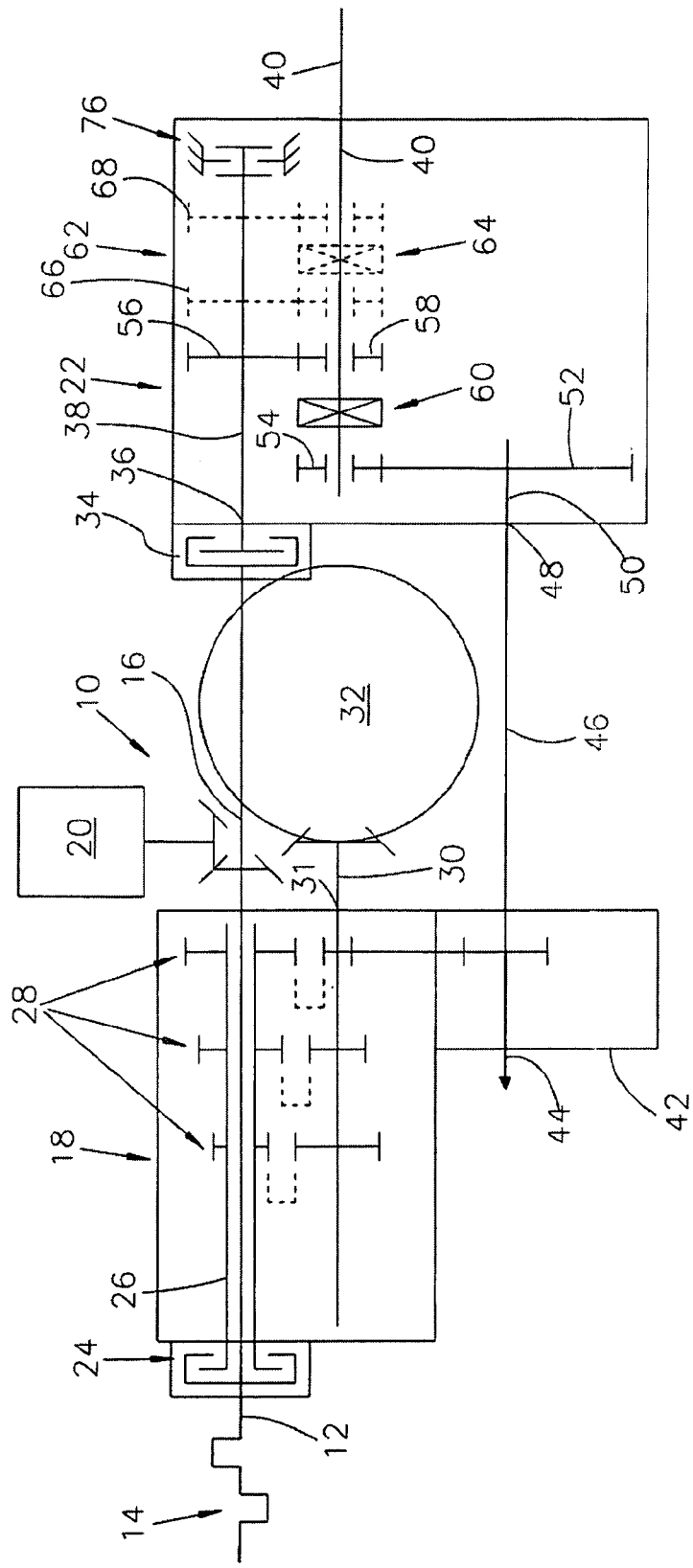
FIG. 1 shows a transmission arrangement for an agricultural utility vehicle according to a first embodiment of the invention.

In the drawings identical or similar components are identified by the same reference numerals. FIG. 1 shows a first exemplary embodiment of a transmission arrangement 10 according to the invention for an agricultural tractor. The output shaft 12 of the internal combustion engine 14 is rotationally fixed to the shaft 16 driven by the internal combustion engine 14. The shaft 16 extends through the drive transmission 18, its rotational speed being uninfluenced by the various shift stage settings of the drive transmission 18. The schematically represented hydraulic pump/transmission oil pump 20 are driven via the shaft 16. Consequently the hydraulic pump/transmission oil pump 20 is driven at a speed which varies directly as a function of the speed of the internal combustion engine 14. In this respect the hydraulic pump and the transmission oil pump 20 are always in operation, irrespective of whether or not the drive transmission 18 or the PTO transmission 22 are operative.

The clutch 24 serves to bring the output shaft 12 of the internal combustion engine 14 into rotational connection with the input shaft 26 of the drive transmission 18 embodied in the form of a hollow shaft. The output shaft 30 of the rear axle transmission output 31 of the drive transmission 18 is driven with a respective transmission ratio as a function of the prevailing shift state of the shift stages 28 of the drive transmission 18. The rear axle differential 32 and hence the wheels (not shown in FIG. 1) of the rear axle (likewise not shown) of the agricultural tractor can therefore be driven. The clutch 34 serves to bring the PTO transmission input 36 into rotational connection with the shaft 16 driven by engine 14. The input shaft 38 of the PTO transmission 22 connected to the PTO transmission input 36 can, to this extent, be made to turn at a speed which varies according to the speed of the internal combustion engine 14. The PTO transmission 22 has an output shaft 40, which can be connected to an input shaft of an implement, which can be adapted to the agricultural tractor and is not shown in the drawings. The drive transmission 18 has a front axle transmission output 42, serving to drive the wheels of a front axle (not shown). Corresponding provision is made for coupling to a front axle differential via the shaft 44.

According to the invention the PTO transmission 22 can be coupled to the front axle transmission output 42 of the drive transmission 18. As a result the output speed of the PTO transmission 22 or of the output shaft 40 can be coupled to the speed of travel of the utility vehicle, thereby providing a road vehicle PTO. The coupling between the front axle transmission output 42 and the PTO transmission 22 is achieved by the means of the shaft 46. The shaft 46 is coupled to the further PTO transmission input 48. The PTO transmission 22 therefore has a further input shaft 50, which may be integrally formed with the shaft 46. The gear wheel 52 rotationally fixed to the further input shaft 50 meshes with the loose gear 54, which is arranged on the output shaft 40 of the PTO transmission 22. The gear wheel 56 rotationally fixed to the input shaft 38 of the PTO transmission 22 meshes with the loose gear 58, which is arranged on the output shaft 40 of the PTO transmission 22. The transmission shifting point 60, that is provided in the PTO transmission 22, serves to establish a rotationally fixed connection either to the loose gear 54 or to the loose gear 58. In the first case a torque would flow from the internal combustion engine 14 to the drive transmission 18, the front axle transmission output 42, the shaft 46, the further input shaft 50 and the gear pair 52, 54 to the output shaft 40 of the PTO transmission 22. In this operating state the output shaft 40 has a speed proportional to the speed of travel of the utility vehicle. If the transmission shifting point 60 establishes a rotationally fixed connection between the loose gear 58 and the output shaft 40, a torque flow is established from the internal combustion engine 14 via the shaft 16 and the input shaft 38 of the PTO transmission 22 and the gear pair 56, 58 to the output shaft 40 of the PTO transmission 22, provided that the clutch 34 is engaged. In this operating state the output shaft 40 of the PTO transmission turns at a speed which varies directly as a function of the rotational speed of the internal combustion engine 14 and which is dependent upon the speed of travel.

As an alternative to the gear pair 56, 58 of the PTO transmission 22 shown in FIG. 1, the reversal stage 62, drawn in dashed lines, may be provided, which serves to rotationally fix the transmission shifting point 64 of the output shaft 40 to a gear wheel of the left-hand gear pair 66 or to a gear wheel of the right-hand gear pair 68. In the one position of the transmission shifting point 64 the output shaft 40 can be set to an output speed of 1000 rpm and in the other position the transmission shifting point 64 can be set to an output speed of 540 rpm, provided that the internal combustion engine 14 is operated at a corresponding speed.

In the exemplary embodiments according to FIGS. 2 to 5 the details of the respective drive transmission 18 together with the rear axle differential 32 and the hydraulic pump or the transmission oil pump 20 are provided as shown in FIG. 1, but are not drawn in. The exemplary embodiment according to FIG. 2 corresponds substantially to the exemplary embodiment in FIG. 1, with the shaft 16 being connected by a shaft-hub connection 70 to the clutch 34 or to the input shaft 38 of the PTO transmission 22. The shaft 46 is also connected by a shaft-hub connection 72 to the front-axle transmission output 42 of the drive transmission 18. The shaft-hub connection 74 connects the shaft 46 to the input shaft 50 of the PTO transmission 22. The PTO transmission 22 has a PTO shaft brake 76, which serves to immobilize the input shaft 38 of the PTO transmission 22 in relation to the housing of the PTO transmission 22.

The schematically indicated clutch 78 may be provided in place of the shaft-hub connection 72 or the shaft-hub connection 74, so that the further input shaft 50 of the PTO transmission 22 can be activated even when the shaft 44 of the front axle transmission output 42 is turning and there is therefore no speed synchronization between the shafts 44 and 46 or 50.

Figure 2:
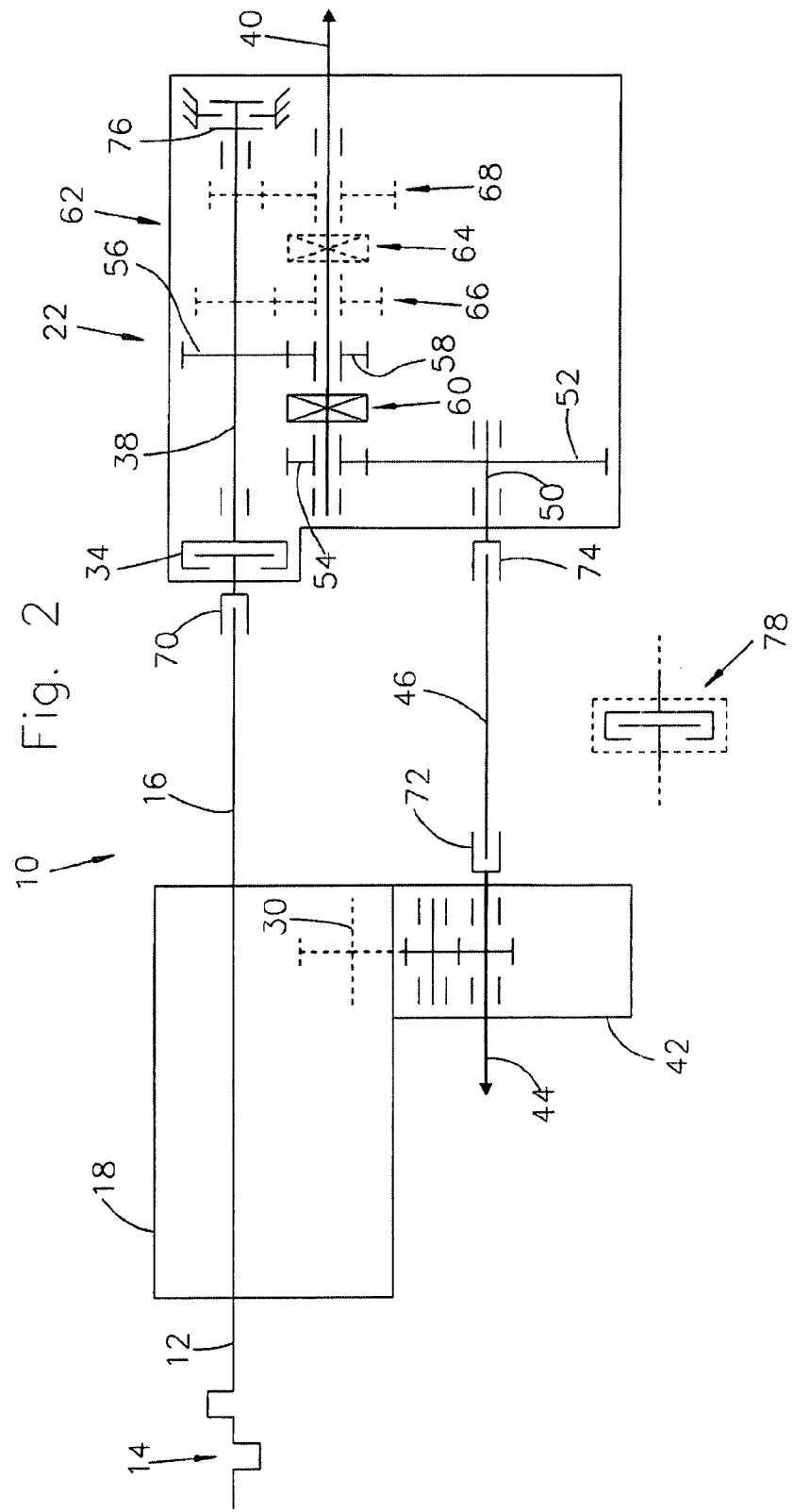
FIG. 2 shows a transmission arrangement for an agricultural utility vehicle according to another embodiment of the invention.
Figure 3:
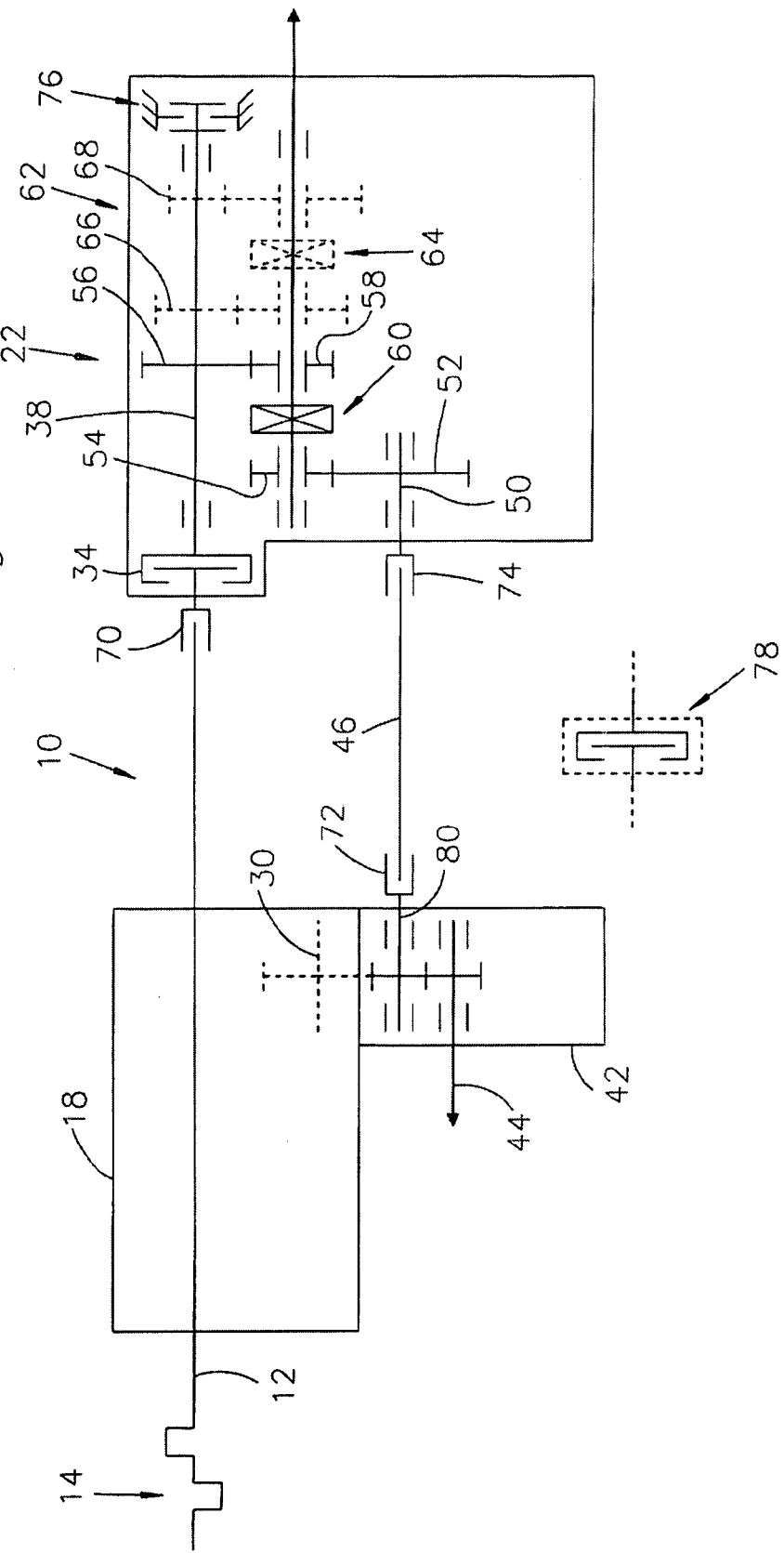
FIG. 3 shows a transmission arrangement for an agricultural utility vehicle according to another embodiment of the invention.

The exemplary embodiment according to FIG. 3 differs from the exemplary embodiment according to FIG. 2 only in that the shaft 46, at its left-hand end, is rotationally fixed by the shaft-hub connection 72 to a shaft 80 of the front axle transmission output 42. The shaft 80 always turns even though the input shaft 26 (not shown in FIG. 3) of the drive transmission 18 is turning, but the front axle drive is not activated. The shaft 46, the further input shaft 50 of the PTO transmission and the gear pair 52, 54 are to this extent also always made to rotate. The shaft 44 of the front axle transmission output 42 according to FIG. 3 is connected to a clutch, not shown in FIG. 3, which ultimately serves to activate or shut off the front axle drive of the agricultural tractor.

Figure 4:
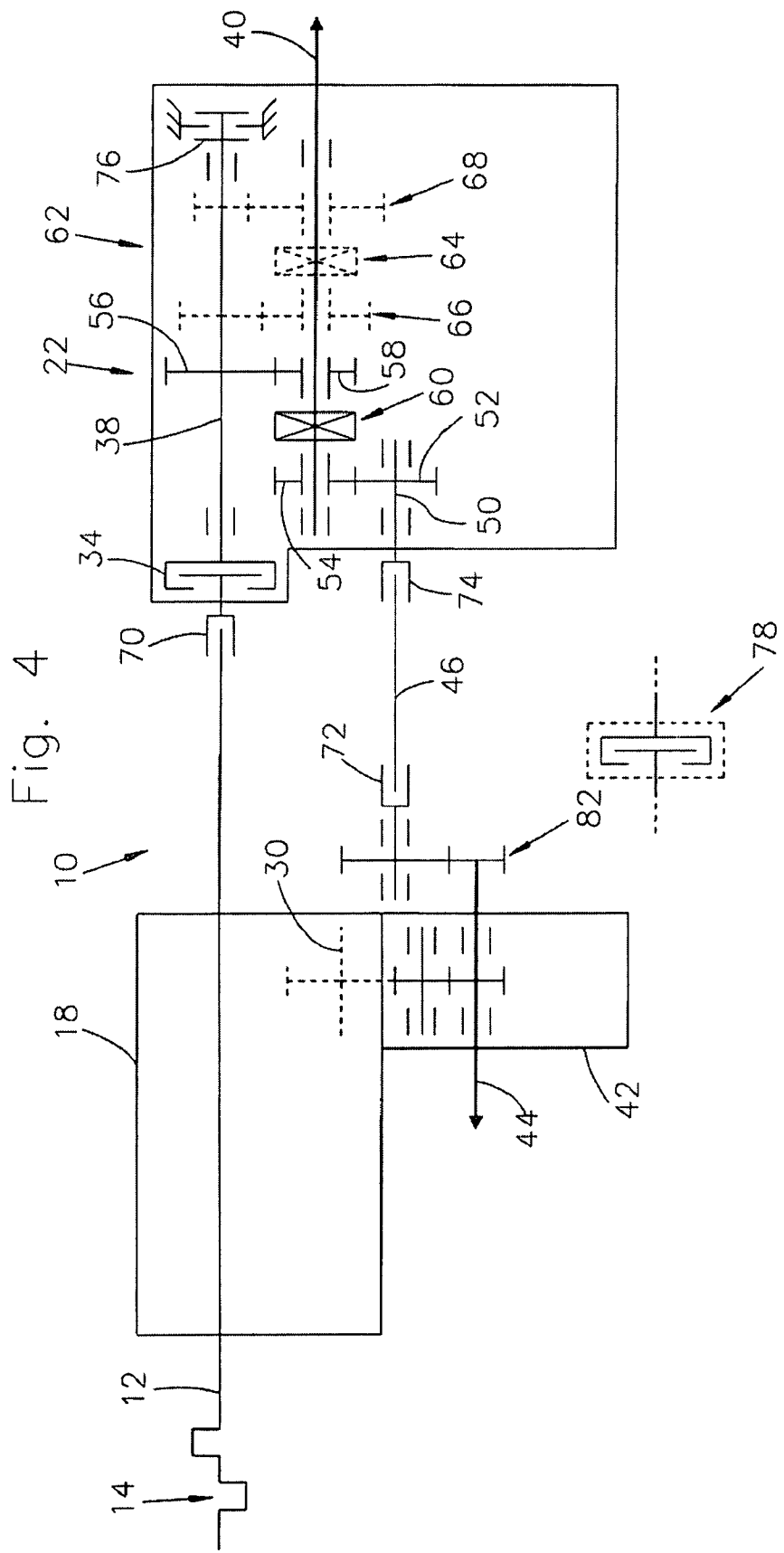
FIG. 4 shows a transmission arrangement for an agricultural utility vehicle according to another embodiment of the invention; and, FIG. 5 shows a transmission arrangement for an agricultural utility vehicle according to another embodiment of the invention.

FIG. 4 shows another exemplary embodiment, which is substantially comparable to the exemplary embodiment in FIG. 2. Here too, the shaft 46 is coupled via the shaft-hub connection 72 to the shaft 44. In FIG. 4, however, in contrast to FIG. 2, a gear pair 82 is provided, which serves to turn the direction of rotation of the shaft 46 or of the output shaft 40 of the PTO transmission 22 in a predetermined direction of rotation. With the vehicle moving forwards, this direction of rotation is preferably clockwise, when viewing the output shaft 40 of the PTO transmission 22 from the rear.

Figure 5:
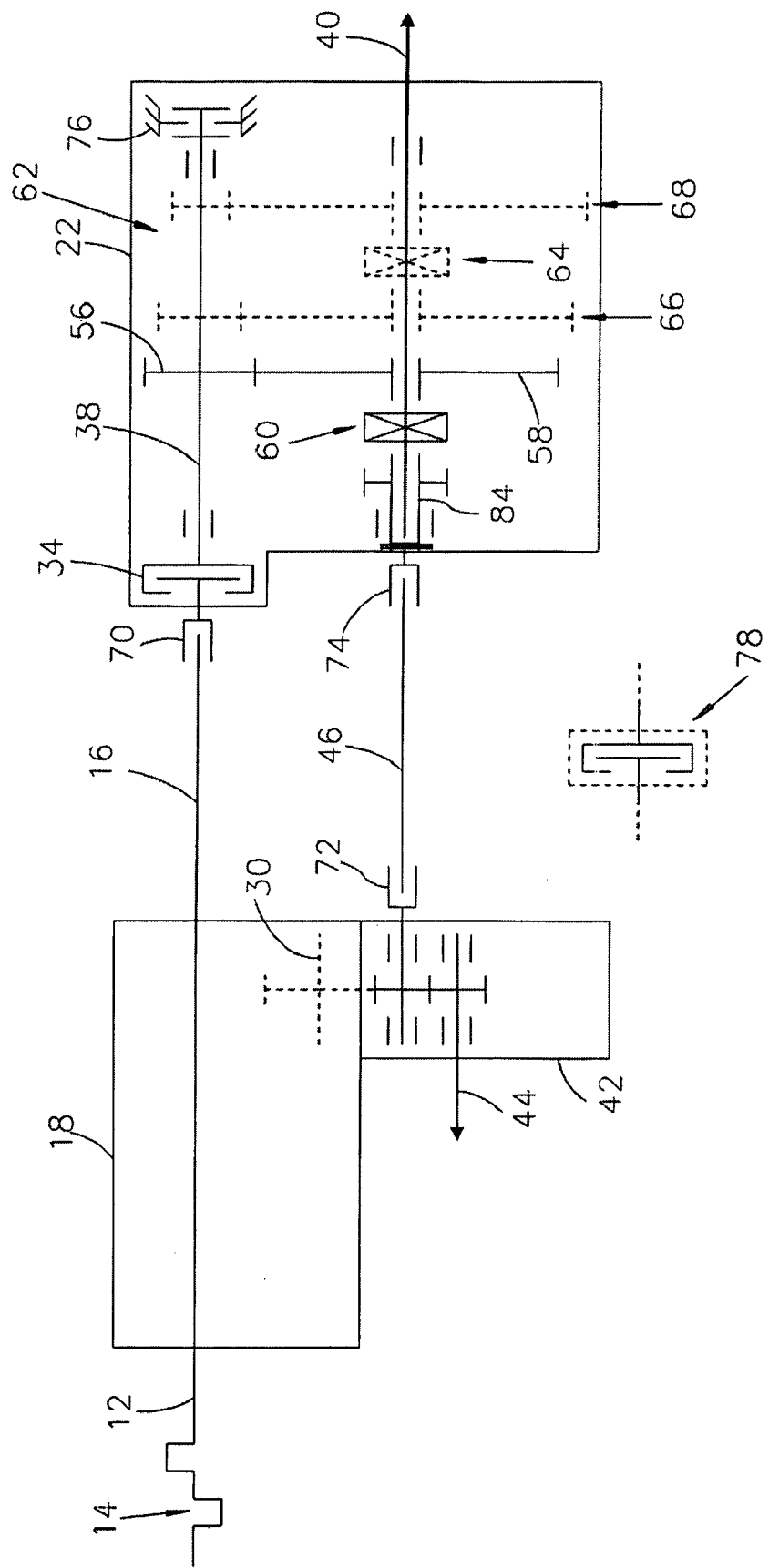

The exemplary embodiment according to FIG. 5 is basically comparable to that in FIG. 3 but differs in the internal arrangement of the PTO transmission 22. The PTO transmission 22 in FIG. 5 also has the input shaft 38 and the gearwheel 56 rotationally fixed thereto, which meshes with the lose gear 58. The reversing stage 62 (drawn in dashed lines) may also be provided. The shaft 46, which connects the front axle transmission output 42 of the drive transmission 18 to the PTO transmission 22 via the shaft-hub connections 72, 74, can be directly coupled to the output shaft 40 of the PTO transmission 22, however, without the use of a gear pair (52, 54 in FIG. 1). The transmission shifting point 60 of the PTO transmission 22 in FIG. 5 can therefore be rotationally fixed to the further input shaft 84, embodied as a hollow shaft. In this operating state the output shaft 40 of the PTO transmission 22 is connected to the internal combustion engine 14 via the shaft 46 and the front axle transmission output 42 and the drive transmission 18 (road vehicle PTO). When the transmission shifting point 60 establishes a rotationally fixed connection between the output shaft 40 of the PTO transmission 22 and the loose gear 58, the torque flows from the internal combustion engine 14 via the shaft 16 and the input shaft 38. In this operating state the output shaft 40 rotates according to the speed of the internal combustion engine.

It may thus be said that the transmission arrangement according to the invention and in particular the actual embodiments set forth in the exemplary embodiments allows a modular construction, in which the transmission shifting points 60, 64 can be provided at substantially the same place of attachment and can easily be connected to the same mechanical shift linkages.

It is also possible to shift between the individual speeds of the output shaft 40 of the PTO transmission 22 with just one shift lever. Thus in a first shift position of a shift lever (not shown) the transmission shifting point 64 might have a rotationally fixed connection to the right-hand gear pair 68, thereby delivering a speed of 540 rpm. In a second shift position of the shift lever the transmission shifting point 64 could be in a neutral position. In a third position of the shift lever the transmission shifting point 64 might establish a rotationally fixed connection to the left-hand gear pair 66, thereby delivering a 540 E (Economy) speed. In a further shift position of the shift lever the transmission shifting point 64 might be in the neutral, middle shift position and the transmission shifting point 60 might have a rotationally fixed connection to the loose gear 58, so that the output shaft 40 of the PTO transmission 22 has a speed of 1000 rpm. In a further shift position of the shift lever the transmission shifting point 60 might have a rotationally fixed connection to the loose gear 54, so that the output shaft 40 of the PTO transmission has a speed which is coupled to the speed of travel of the utility vehicle, and therefore affords a road vehicle PTO. For this purpose the two transmission shifting points 64, 60 might interact with a single cam disk, which actuates corresponding gearshift forks of the transmission shifting points 64, 60—controlled by just one shift lever.

Any clutches provided can be operated independently of one another, each being provided with a separate switch or lever for this purpose.

All gear wheels, shafts, bearings, shift linkages and clutches associated with the PTO transmission 22 could be integrated into a single PTO transmission module. The PTO transmission 22 is particularly easy to fit to the vehicle or the drive transmission 18 if—as shown in FIG. 2, for example—the shaft 16 is formed by means of the shaft-hub connection 70 and the shaft 46 by means of the shaft-hub connection 74.

FIGS. 1 to 4 show a transmission arrangement 10 according to the invention, which comprises a drive transmission 18 driven by an engine 14 of the utility vehicle, and a PTO transmission 22. The drive transmission 18 has two drive transmission outputs 31 and 44, each driving a vehicle axle of the utility vehicle, namely the rear axle and the front axle (not shown in the drawings). The PTO transmission 22 serves to drive an implement adaptable to the utility vehicle. The PTO transmission 22 can be driven independently of the drive transmission 18 by the shaft 16 driven by the engine 14 of the utility vehicle. In this case the speed of the output shaft 40 of the PTO transmission 22 varies according to the speed of the engine 14 of the utility vehicle. In an alternative operating mode the PTO transmission 22 can be coupled to the drive transmission output 42 of the drive transmission 18 via a further shaft, the output speed of the PTO transmission 22 then varying as a function of the speed of travel of the utility vehicle.

Having described the preferred embodiment, it will become apparent that various modifications can be made without departing from the scope of the invention as defined in the accompanying claims.

The invention claimed is:

1. A transmission arrangement of one of an agricultural and industrial utility vehicle, comprising a drive transmission, driven by an engine of the utility vehicle, and a PTO transmission, the drive transmission having a rear axle transmission output for driving a rear axle of the utility vehicle, the drive transmission having a front axle transmission output for driving a front axle of the utility vehicle, the PTO transmission serving to drive an implement adaptable to the utility vehicle, and the PTO transmission being drivable via one of a PTO transmission output of the drive transmission and independently of the drive transmission via a shaft driven by the engine of the utility vehicle, wherein the PTO transmission is driven by the engine by way of the front axle transmission output of the drive transmission, in order to couple the output speed of the PTO transmission to the speed of travel of the utility vehicle.

2. The transmission arrangement as claimed in claim 1, wherein the PTO transmission has a PTO transmission input, coupled to one of the PTO transmission output of the drive transmission or to the shaft driven by the engine of the utility vehicle.

3. The transmission arrangement as claimed in claim 1, wherein the PTO transmission has a further PTO transmission input, which can be coupled to the front axle transmission output of the drive transmission.

4. The transmission arrangement as claimed in claim 1, wherein the PTO transmission is driven via one of the front axle transmission output of the drive transmission or independently of the drive transmission via a shaft driven by the engine of the utility vehicle.

5. The transmission arrangement as claimed in claim 1, wherein the PTO transmission is driven via one of the front axle transmission output of the drive transmission or the PTO transmission output of the drive transmission.

6. The transmission arrangement as claimed in claim 2, wherein a clutch serves to couple the shaft driven by the engine of the utility vehicle to the PTO transmission input.

7. The transmission arrangement as claimed in claim 2, wherein a clutch serves to couple the PTO transmission output of the drive transmission to the PTO transmission input.

8. The transmission arrangement as claimed in claim 3, wherein a clutch serves to couple the front axle transmission output of the drive transmission to the further PTO transmission input.

9. The transmission arrangement as claimed in claim 6, wherein the clutch is assigned to the PTO transmission input.

10. The transmission arrangement as claimed in claim 6, wherein the clutch is embodied as one of a friction clutch or a positively interlocking clutch.

11. The transmission arrangement as claimed in claim 1, wherein a transmission shifting point is provided, which serves for switching between a PTO transmission driven by the front axle transmission output of the drive transmission or driven by the shaft driven by the engine of the utility vehicle.

12. The transmission arrangement as claimed in claim 1, wherein a transmission shifting point is provided, which serves for shifting between a PTO transmission driven by one of the front axle transmission output of the drive transmission or the PTO transmission output of the drive transmission.

13. The transmission arrangement as claimed in claim 11, wherein the transmission shifting point is assigned to the PTO transmission.

14. The transmission arrangement as claimed in claim 1, wherein the PTO transmission is coupled to the front axle transmission output by a shaft.

15. The transmission arrangement as claimed in claim 14, wherein the shaft is coupled to a part of the front axle transmission output, which is active even when the front axle drive is inoperative.

16. The transmission arrangement as claimed in claim 14, wherein the shaft is coupled to a part of the front axle transmission output, which is active only when the front axle drive is operative.

17. A transmission arrangement of one of an agricultural and industrial utility vehicle, the transmission arrangement comprising a drive transmission, which is driven by an engine of the utility vehicle, and a PTO transmission, the drive transmission having a drive transmission output for driving a vehicle axle of the utility vehicle, the PTO transmission serving to drive an implement adaptable to the utility vehicle, and the PTO transmission being drivable by a shaft via one of a PTO transmission output of the drive transmission and independently of the drive transmission via a shaft driven by the engine of the utility vehicle, wherein the PTO transmission is driven by the engine by way of the drive transmission output of the drive transmission via a further shaft, in order to couple the output speed of the PTO transmission to the speed of travel of the utility vehicle.

* * * * *